(12) United States Patent
Steffen et al.

(10) Patent No.: US 9,582,326 B2
(45) Date of Patent: Feb. 28, 2017

(54) QUALITY OF SERVICE CLASSES

(71) Applicant: Apple Inc., Cupertino, CA (US)

(72) Inventors: Daniel A. Steffen, Cupertino, CA (US); Matthew W. Wright, Cupertino, CA (US); Russell A. Blaine, Jr., San Francisco, CA (US); Daniel A. Chimene, San Francisco, CA (US); Kevin J. Van Vechten, San Francisco, CA (US); Thomas B. Duffy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 14/292,687

(22) Filed: May 30, 2014

(65) Prior Publication Data
US 2015/0347189 A1    Dec. 3, 2015

(51) Int. Cl.
*G06F 9/46*    (2006.01)
*G06F 9/48*    (2006.01)

(52) U.S. Cl.
CPC .......... *G06F 9/4893* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,199,124 B1 | 3/2001 | Ramakrishnan et al. | |
| 6,859,926 B1 * | 2/2005 | Brenner | G06F 9/5038 718/100 |
| 7,302,686 B2 | 11/2007 | Togawa | |
| 7,565,652 B2 | 7/2009 | Janssen et al. | |
| 8,347,296 B2 | 1/2013 | Yasutake | |
| 8,468,534 B2 * | 6/2013 | Tunning | G06F 9/4881 711/169 |
| 8,566,828 B2 | 10/2013 | Pilkington | |
| 8,640,129 B2 | 1/2014 | Cismas et al. | |
| 2007/0104101 A1 * | 5/2007 | Sadr | H04B 7/18582 370/230 |
| 2008/0075101 A1 * | 3/2008 | Illikkal | G06F 9/5038 370/412 |
| 2010/0125848 A1 | 5/2010 | Dadhich et al. | |
| 2010/0145643 A1 * | 6/2010 | Katpelly | G06F 1/3203 702/63 |

(Continued)

OTHER PUBLICATIONS

Wu et al, Task Allocation and Migration Algorithm for Temperature-constrained Real-time Multi-Core systems, 2010, IEEE, pp. 189-196.*

(Continued)

*Primary Examiner* — Diem Cao
(74) *Attorney, Agent, or Firm* — Blakely, Sokoloff, Taylor & Zafman LLP

(57) ABSTRACT

In one embodiment, tasks executing on a data processing system can be associated with a Quality of Service (QoS) classification that is used to determine the priority values for multiple subsystems of the data processing system. The QoS classifications are propagated when tasks interact and the QoS classes are interpreted a multiple levels of the system to determine the priority values to set for the tasks. In one embodiment, one or more sensors coupled with the data processing system monitor a set of system conditions that are used in part to determine the priority values to set for a QoS class.

29 Claims, 9 Drawing Sheets

(56) References Cited

U.S. PATENT DOCUMENTS

| | | | | |
|---|---|---|---|---|
| 2013/0227581 A1* | 8/2013 | Nader | ............... | G06F 9/4881 |
| | | | | 718/103 |
| 2013/0262891 A1* | 10/2013 | Gudlavenkatasiva | | |
| | | | ............... | G06F 1/3212 |
| | | | | 713/320 |
| 2013/0305258 A1* | 11/2013 | Durant | ............... | G06F 9/4881 |
| | | | | 718/106 |
| 2013/0332941 A1 | 12/2013 | Ramesh et al. | | |

OTHER PUBLICATIONS

Lui Sha et al., "Priority Inheritance Protocols: An Approach to Real-Time Synchronization", IEEE Transactions on Computers, vol. 39, No. 9, Sep. 1990, pp. 1175-1185.

* cited by examiner

QUALITY OF SERVICE CLASSES

CROSS-REFERENCE

The present application is related to co-pending U.S. patent application Ser. No. 14/292,123, titled I/O Scheduling, filed May 30, 2014, which is hereby incorporated by reference.

The present application is related to co-pending U.S. patent application Ser. No. 13/895,262, titled System and Method for Selective Timer Coalescing, filed May 15, 2013, which is hereby incorporated by reference.

BACKGROUND OF THE DISCLOSURE

Applications executing on a data processing system can perform operations by requesting the system to perform specific tasks. It is possible for a single operation to result in several task requests. To handle the multiple requests, the tasks can be placed in one or more queues and various processes and utilities of the data processing system handle the queued operations. The performance of the several task requests may create resource contentions between the several tasks or between system related tasks performed by the operating system. Accordingly, data processing systems known in the art may implement some form of task prioritization.

While processor task prioritization is known in the art, prioritization can also be extended to other subsystems of the data processing system. However, the interaction between the priority levels of each prioritized subsystem may be complex, and the proper task priority to set for each subsystem may be counterintuitive. For example, if a task requests an I/O priority that conflicts with the task's processor priority the overall system performance may suffer. Accordingly, application developers may be reluctant to set the various subsystem priority settings for application tasks. Additionally, application developers may not immediately aware of new system priority classifications as the classifications become available.

SUMMARY OF THE DESCRIPTION

In various embodiments, a holistic priority system including multiple quality of service classifications is presented to automate the setting of multiple data processing system priorities. In one embodiment, a data processing system comprises one or more processors, one or more sensors coupled to the one or more processors, and a memory storage system coupled to the one or more processors. The one or more sensors are to monitor a set of system conditions. The memory storage system can store a priority matrix and a priority manager. The priority matrix includes multiple sets of priority values associated with multiple system priorities. The priority manager can be configured to set the multiple system priorities for a task based at least in part on a set of priority values in the priority matrix and the set of system conditions determined by the one or more sensors.

In one embodiment, the priority manager is to set the multiple system priorities for a first task based at least in part on a first set of priority values associated with a first service classification of multiple service classifications. The first set of priority values can be further determined based on a relative priority for a task, where the relative priority is relative to other tasks within the same service classification.

In one embodiment, the first task can be a task for a user space application. The multiple service classifications available to a user space application can include a classification for user interactive operations, user initiated operations, utility operations and application background operations.

In one embodiment, the priority manager is to set the multiple system priorities for a task to perform a system operation for the operating system of the data processing system, where the multiple service classifications include a classification for system rendering operations and a classification for system initiated background or maintenance operations.

In one embodiment the priority matrix includes values associated with each of the multiple system priorities, where the multiple system priorities can include a processor priority associated with the one or more processors and an input/output priority associated with the memory storage system. The multiple system priorities can additionally include a throttling priority, a timer latency classification, and a throughput classification.

In one embodiment, a second task including a second service classification of the multiple service classifications can execute on the one or more processors of the data processing system. The second task can be configured to process a request received from the first task. When the request is a synchronous request, the system priorities for the request can be inherited from the first task and set at least in part based on the first service classification. When the request is an asynchronous request, the system priorities for the request can be based on the service classification of the second task and set based on the second service classification. In one embodiment, the second task includes a request queue to store the request received from the first task. The request queue can have a third service classification, where the system priorities for the asynchronous request are set to the third service classification.

In one embodiment, the set of system conditions monitored by the one or more sensors include a battery, a thermal, and a power condition, and the priority matrix includes multiple sets of values that correspond with a combination of system conditions in the set of system conditions.

In one embodiment, a non-transitory computer-readable medium stores instructions which, when executed by a processor, cause the processor to perform operations comprising assigning, to a first task, a first service classification selected from multiple service classifications, each service classification associated with a priority matrix having multiple sets of priority values corresponding to multiple system priorities, wherein the first service classification is associated with a first priority matrix, and based on a set of system conditions detected by one or more sensors, setting multiple system priorities for the first task based on values in a first set of priority values of the first priority matrix.

In one embodiment, the medium further comprises instructions to perform further operations including receiving from the first task a request including an execution block having the service classification of the first task and in response to the request, adding the execution block to a queue of a second task. The second task can have a second service classification that is different from the first service classification. The second task can then process one or more execution threads associated with the execution block. The execution threads can inherit the service classification assigned to the first task.

In one embodiment, the medium further comprises instructions to perform further operations including, based on the set of system conditions detected by the one or more sensors, setting multiple system priority values for one or more execution threads based a set of priority values associated with the set of system conditions and the service classification.

In one embodiment, the instructions additionally include, in response to a change in a condition in the set of system conditions, assigning new values to the multiple system priorities based on values in a second set of priority values associated with the set of system conditions and the service classification.

The above summary does not include an exhaustive list of all aspects of the present invention. It is contemplated that embodiments of the invention include all systems and methods that can be practiced from all suitable combinations of the various aspects summarized above, and those disclosed below.

BRIEF DESCRIPTION OF THE DRAWINGS

The embodiments are illustrated by way of example and not limitation in the figures of the accompanying drawings, in which similar references indicate similar elements.

DETAILED DESCRIPTION

Due to the counter-intuitive nature of complex priority systems, it may be difficult for an application developer to properly manage the priority settings available for each subsystem of the data processing system. This is particularly relevant in multiprocessor systems where an application can include multiple concurrent processes each performing various operations. Each process, in turn, can spawn multiple work elements (e.g., tasks, threads, etc.) in service of the various operations. A work element is a thread, task, or other grouping of instructions that are to be executed by the data processing system.

In one embodiment, the priority system enables developers to classify tasks or threads into one of multiple quality of service classifications (QoS classes). The QoS class for the task can be used to determine multiple underlying system priority settings. The QoS class of the parent task can propagate along with each task as the task propagates through the system. The various components of the operating system can interpret the QoS class based in part on a set of system conditions applicable to the current operational state of the data processing system, such as battery level or internal temperature, (e.g., battery state, thermal state, system load, etc.). In one embodiment, the QoS class is interpreted on a per-component basis, where each component that handles the tasks for the process can interpret the category as appropriate for each component.

Quality of Service Classifications

In one embodiment, the service classes include a user interactive class, a user initiated class, a utility class, and a background class. An application developer can classify a work element performed for an application or process into one of the available QoS classes and allow the system to automatically manage the each of the plurality of priorities for application tasks.

In one embodiment a task can have a relative priority value in addition to a QoS class. The relative priority value is a priority ranking for a task within a QoS class. In one embodiment, a task has a default relative priority of zero and the task may be assigned a negative priority value to reduce the priority of the task relative to the default priority. In one embodiment, the relative priority can be reduced up to a value of negative fifteen. However, more or fewer priorities can be used without deviating from the spirit of the embodiments.

Figure 1:
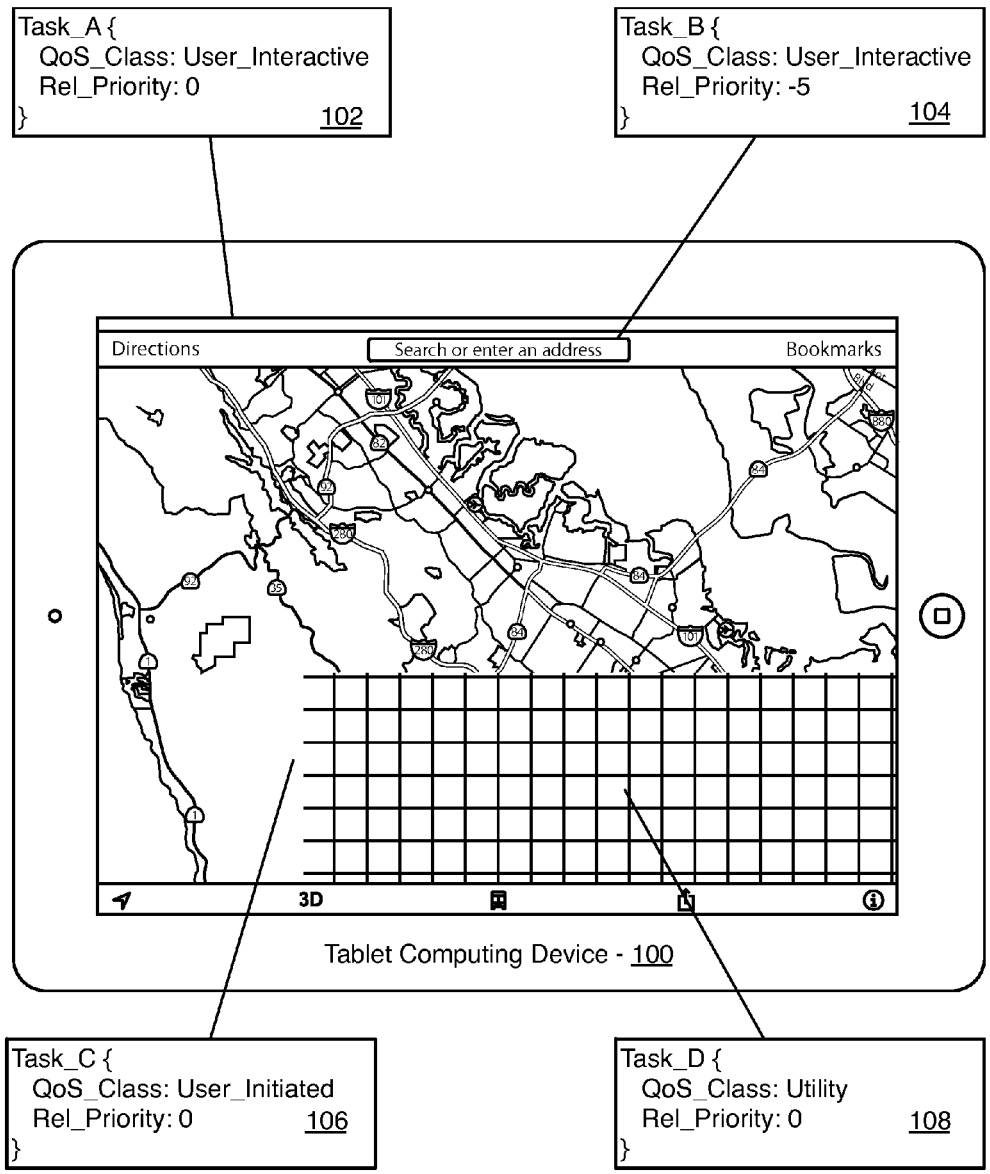
FIG. 1 is an illustration of exemplary classifications for application tasks, according to an embodiment.

FIG. 1 is an illustration of exemplary classifications for application tasks, according to an embodiment. In one embodiment, an application executing on a multi-core data processing system (e.g., a tablet computer 100) performs multiple tasks in a substantially concurrent manner. Task_A 102 is a user interactive class at relative priority zero that listens for incoming events from a touch screen display and adjusts (e.g., zooms, pans, transforms, etc.) the rendered images based on the input. The user interactive class can be assigned to a task that directly interacts with a user, such as a user interface rendering task or a manager for user interface elements. These tasks are classified at a high priority because of the importance of user interface responsiveness in providing a positive user experience for users of the data processing system.

Task_B 104 is a user interactive task to listen for and process results received at a text input field for the application. Task_B 104 is interactive with the user, but may be assigned a lower relative priority (e.g., −5) than the default. Accordingly, Task_B 104 executes at a slightly lower system priority than, for example, Task_A 102, but at a higher priority than tasks in the lower QoS classes.

Task_C 106 is a user initiated task that can render new map information after the map data download. The user initiated class can be assigned to tasks that are initiated by a user but are not directly interactive. Task_A 102 can preempt Task_C 106, for example, if the user zooms in or out of the map. Task_B 104 can preempt Task_C 106 if the user selects the search bar to enter or search for an address. Other user initiated tasks include tasks that load website data in response to a hyperlink selection. Tasks in the user initiated class are executed at a high priority, but not as high of a priority as user interactive tasks. Thus, a task in the user initiated class can preempt all other user tasks other than user interactive tasks.

Task_D 108 is a utility class that downloads new map data for an area. The utility class can be assigned to a task that is useful to the user but that is not as urgent as a task in the user initiated class. Task_D 108 is managing a download for a user, which is useful for the user, but less urgent than the user interactive or user initiated tasks. Thus, Task_D 108 may be placed within the utility class because the user is presently interested in the downloading data and a developer would be unlikely to intentionally delay access to resources for the download manager. However, the download manager task should not be allowed to pre-empt a user-initiated task that is considered more urgent. For example, as map data is downloaded, Task_C 106 can preempt Task_D 108 to display a portion of the newly download map data.

In addition to QoS classes for active tasks, a background QoS class is available to an application for tasks to be executed when resources are otherwise idle. The background class can be assigned to low-priority tasks that provide services to the user. The user may not be directly aware of the operation of the background tasks. For example, the map application may perform background synchronization with data from a user's address book. Additionally, a mail program can classify a mail indexing thread as a background thread.

The set of tasks shown in FIG. 1 are intended to exemplify QoS classifications for application tasks, but are not intended to be limiting, as an application may use fewer or more tasks having different classifications than shown. Moreover, the tasks may be configured to operate on a variety of data processing system hardware and are not specific to the tablet computing device 100.

In one embodiment, an additional set of QoS classes is available to application developers and an additional set of classes is available only to the operating system of the data processing system. An A/V rendering class can be assigned to system initiated tasks that perform audio or video rendering. The operating system can classify some rendering tasks at a higher priority than any user initiated task to maintain a quality multimedia experience when the system is under heavy load. For example, the tablet computing device 100 can concurrently execute a music player while presenting the map application. An audio rendering task, such as a compressed audio decoder, can be assigned the A/V rendering QoS classification and operations performed by the task may preempt other tasks to prevent resource contention related interruptions to music playback. If a video is to be played on the tablet computing device 100, a video player can be presented as the foreground application. The video decode and post processing tasks performed by the operating system in support of audio and video rendering can be assigned to the A/V rendering classification. The tasks in the A/V rendering class can be allowed to preempt tasks in all of the other QoS classifications.

In one embodiment, a maintenance class is available to the operating system for tasks that are to perform operations below the priority of the background class. Tasks in the maintenance class can be preempted by tasks in all other QoS classifications. An exemplary maintenance class task is file system indexing. A file system indexing task can be performed by a system utility to index the contents of a storage device, which facilitates searches through the contents of the file system. This type of indexing may be used by a search application such as "Spotlight" from Apple Inc. of Cupertino, Calif.

The QoS classification and relative priority can be stored in a data structure associated with each task and retrieved when performing priority dependent operations. In one embodiment, the QoS classification and relative priority are stored as a tuple value. In one embodiment, each combined QoS class and relative priority resolves to an integer value, allowing the relative priority of a set of classes to be arithmetically determined using comparison operations.

System Priorities Configured by QoS Class

Figure 2:
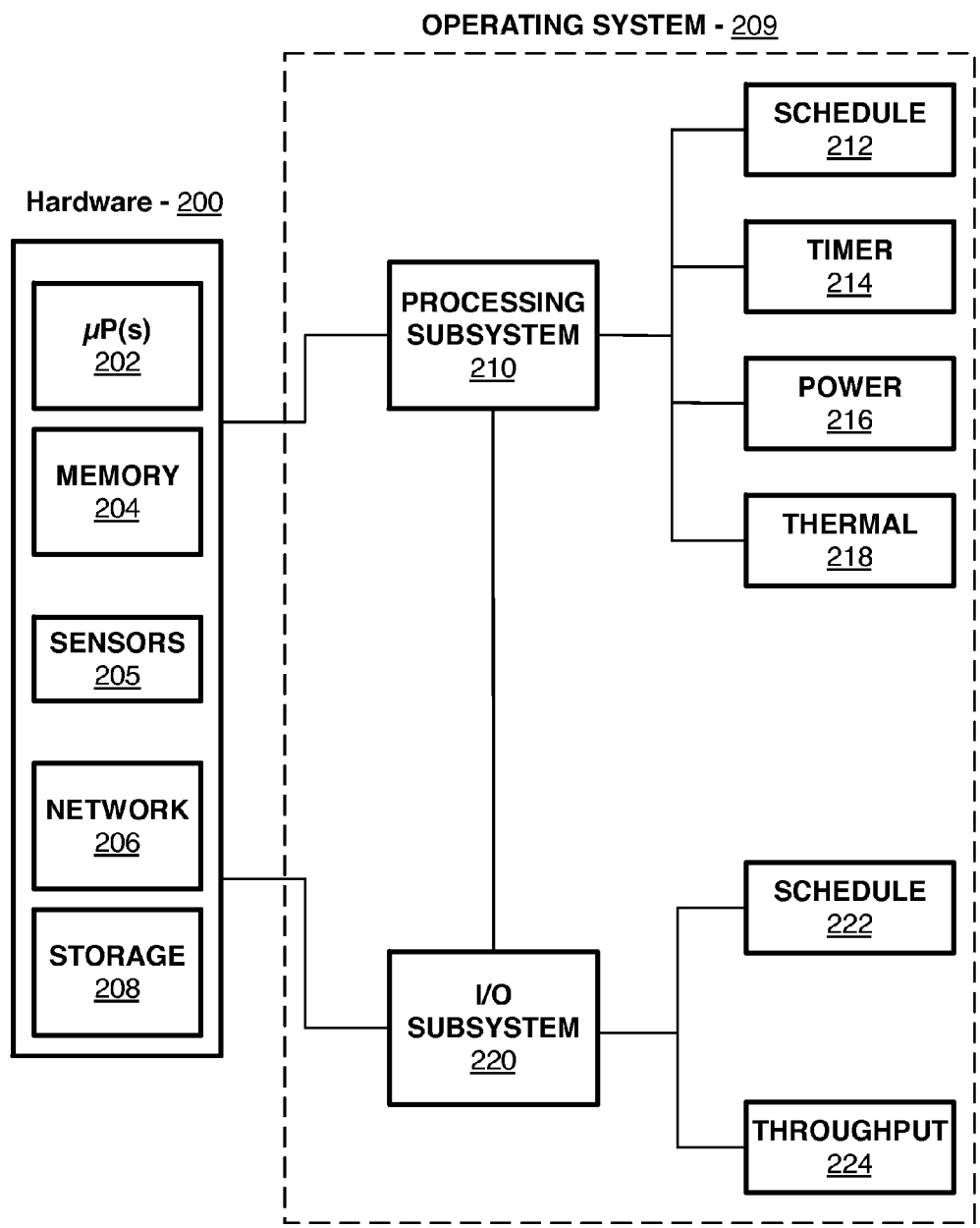
FIG. 2 is a block diagram of exemplary prioritized subsystems, according to an embodiment.

Priority for multiple subsystems of the data processing system can be configured for each task or thread based on the assigned quality of service class. FIG. 2 is a block diagram of exemplary prioritized subsystems, according to an embodiment. In one embodiment, an operating system 209 manages task access to hardware 200 via multiple subsystems. A processing subsystem 210 and I/O subsystem 220 are shown. The processing subsystem 210 includes schedule 212, timer 214, power 216, and thermal 218 managers. The I/O subsystem 220 includes a schedule 222 manager and a throughput manager 224.

In one embodiment, the processing subsystem 210 handles task access to the one or more microprocessors 202 in hardware 200. Operations to and from memory 204 can also be influenced, managed, or controlled by the processing subsystem. The schedule manager 212 schedules tasks for execution on the one or more microprocessors 202. The timer manager 214 schedules and handles timer interrupts, which provide the operating system 209 with a time-driven interrupt source to trigger periodic activity. The power manager 216 influences processor power states, including idle states. The thermal manager 218 influences processor operations based on thermal states, including setting a processor throttle state to cool the processor.

In one embodiment, the schedule manager 212 priority assigned to a task indicates the urgency or importance with which a task or thread is to be scheduled when multiple tasks are contending for processor resources. Accordingly, the highest priority QoS classes (e.g., A/V rendering, user Interactive) receive the highest schedule priority, allowing those tasks to be scheduled for processing ahead of other tasks. A task with a higher priority than other tasks may consume a greater amount of processor resources, causing the task to appear more responsive than a task having a lower priority, provided sufficient processor resources exist to service all high priority tasks.

In addition to priority based task arbitration during resource contentions, an embodiment of the schedule manager 212 can selectively force a task to idle even when processor resources are available. In one embodiment, tasks are scheduled with equal priority when resources are not in contention. For example, a task in the user interactive class can be scheduled to execute concurrently with a task in the background class if sufficient execution resources are available. During selective forced idle a task can be skipped on a periodic basis when scheduling execution resources, causing the task to receive reduced processing resources.

In one embodiment, the tasks in a low priority service class can be forced to periodically idle to preserve processor resources for other tasks. This can be used to ensure a minimum amount of processing resources are always available to schedule unanticipated high-priority tasks. The selective forced idle can be based on the primary schedule priority for a QoS class, or a separate value can be used to determine if and how often a task is forced to idle. For example, tasks in the maintenance QoS class may have a forced idle value, to limit the amount of processing resources that the tasks are allowed to consume.

In one embodiment, the timer manager 214 priority is associated with a timer coalescing feature. Instead of having a fixed execution time for each timer, an embodiment allows each timer to be executed within a scheduling window of the timer. The scheduling window is defined by an initial execution time and a latency time. The initial execution time is the time when the timer is initially scheduled to be executed. The latency time is the length of the window in which the timer can be executed. The timer can then be executed at any time in the timer scheduling window.

Coalescing the timer interrupts can reduce the number of idle state transitions made by the processors 202. The processors 202 enter a low power state when idle. If a processor is in a low power state during the expiration of a timer, the processor will transition to an operational state to handle the timer interrupt. By executing more timers within a processor wakeup than would otherwise occur, the number of processor wakeups can be reduced, which reduces the number of idle state transitions. Reducing the number of idle state transitions increases the amount of time the processors 202 can spend in a low power state, which reduces system power consumption.

However, tasks in the higher priority QoS classes are presumed to be latency sensitive. Accordingly, a task in a high priority QoS class can be assigned a high timer priority to reduce or eliminate the amount of time a timer interrupt for the task is delayed. In one embodiment, a rate-limit can be placed on the execution of lower priority timers, causing the lower priority timers execute less frequently, which can lower the power impact caused by low priority tasks.

In one embodiment, the power 216 and thermal 218 managers operate cooperatively to limit the power consumption of the data processing system when idle and to reduce the thermal load caused by active components within the data processing system hardware. A set of sensors 205 integrated or coupled with the hardware 200 can monitor a set of system conditions including one or more of a battery, a thermal, and a power condition. The system conditions monitored by the sensors can be used to change the behavior applied to tasks within the various QoS classes based on the monitored system conditions. For example, under heavy thermal load, the processing subsystem 210 can throttle the dispatch rate of tasks based on the QoS class of the task or apply system-wide throttling to each task based on the QoS class of the task.

In one embodiment, a system throttling priority value can be applied based on the QoS class of a task to influence the degree to which the power 216 and thermal 218 managers may throttle system resources when those tasks are active. For example, a task in the A/V rendering QoS class may be allowed to cause the data processing system's heat and power consumption to increase significantly before throttling is imposed. By comparison, the power manager 216 may throttle the microprocessors 202 or processing subsystem 210 when only background or maintenance class tasks are active.

In one embodiment, The I/O subsystem is configured to handle operations to and from storage 208 and network 206 or user I/O devices. In one embodiment, some memory related tasks, such as virtual memory management, are influenced by the I/O subsystem. In one embodiment, the I/O schedule manager 222 performs a similar service as the schedule manager 212 of the processing subsystem 210. Tasks can send prioritized I/O requests to the I/O subsystem 220, and the I/O schedule manager 222 can schedule those tasks for dispatch to a target I/O device.

In one embodiment, the schedule manager 222 is used in concert with a virtual memory manager to allocate and map memory resources for use when accessing the storage 208. The I/O schedule manager 222 priority for a task can be used to determine whether an I/O request for a task can be allowed to preempt other I/O requests. The throughput manager 224 can limit the maximum I/O rate available to tasks based on the task QoS class. In one embodiment, I/O resources are preserved for higher priority tasks by limiting the frequency in which I/O requests are serviced for low priority tasks, such that a task in the background service class has a lower maximum I/O throughput in comparison to a task in the user interactive class.

I/O scheduling and throughput can be controlled using several priority based methods that can be tuned based on priority values associated with a QoS class. In one embodiment, the I/O subsystem 220 includes a priority based QoS system that is specific to I/O operations. In the I/O QoS system, each I/O request can have expected time of completion based on the I/O schedule priority, where high priority requests have a shorter expected completion time in comparison to low priority requests. If an I/O request is pending beyond the expected time of completion for the request priority, the request can be allowed to preempt other tasks that are not yet overdue. In one embodiment, the I/O subsystem 220 QoS is implemented at least partly in the hardware 200. The storage 208 can include a storage processor that is switchable between several operational modes to selectively process I/O requests to hardware based on request priority and expected time of completion.

In one embodiment, the I/O subsystem 220 includes a system of weighted deadline queues. Each I/O request has a deadline for completion that is determined at least in part by the task priority. Lower priority tasks can have longer deadlines for completion, which allows the lower priority tasks to be preempted by higher priority tasks. In one embodiment, a pending task is dispatched to a lower level of the I/O subsystem when the task deadline is reached, which allows tasks preemption without causing the starvation of low priority tasks.

The hardware 200 and operating system components 209 shown are exemplary, and priorities for subsystems other than the processing subsystem 210 and I/O subsystem 220 managed based on QoS class. For example, access to a graphics processor can be managed by one or more of the processing system 210, I/O subsystem 220, or a separate graphics subsystem.

In one embodiment, the QoS system is expandable to incorporate new prioritized subsystems as they are added to the operating system 209 or hardware 200. Additionally, if the prioritization system for any subsystem were to change, for example, to add or remove priorities, the operating system 209 can be updated to manage the new system without requiring developers to rewrite priority management for applications. Any differences between differing versions of hardware 200 of operating system software 209 can be handled transparently to the developer. This can have the beneficial effect of reducing the amount of development time required to update applications for when new version of hardware 200 or operating system 209 software is released.

In one embodiment, the precise values used to indicate a specific priority level varies across subsystems. The priority for each subsystem element can be assigned based on a value within a range of numbers. In one system a low value indicates a low priority, while a different system can use a low value to indicate a high priority. Additionally, systems can have values within different ranges (e.g., (−20,20), (0,10), 0, 127). For throughput based systems, the priority value can reflect a percentage cap associated with a maximum amount of processor or I/O resources a task may access. The varying values, ranges and orientation for priority values across the various subsystems can enhance the difficulty experienced by application developers when attempting to manage individual thread priorities for their applications. In one embodiment, the QoS system uses priority manager to automate the setting of these values for each task.

QoS Class Interpretation

When a system component receives a request from a work element, the priority settings used when performing the request are dynamically interpreted by the system. The system can maintain a multi-dimensional priority matrix including multiple sets of priority values for multiple system priorities. The priority values are configured to maintain the relative priority of the various classes, but adjust the priority settings to optimize overall system performance or power consumption based on the current system conditions.

Figure 3:
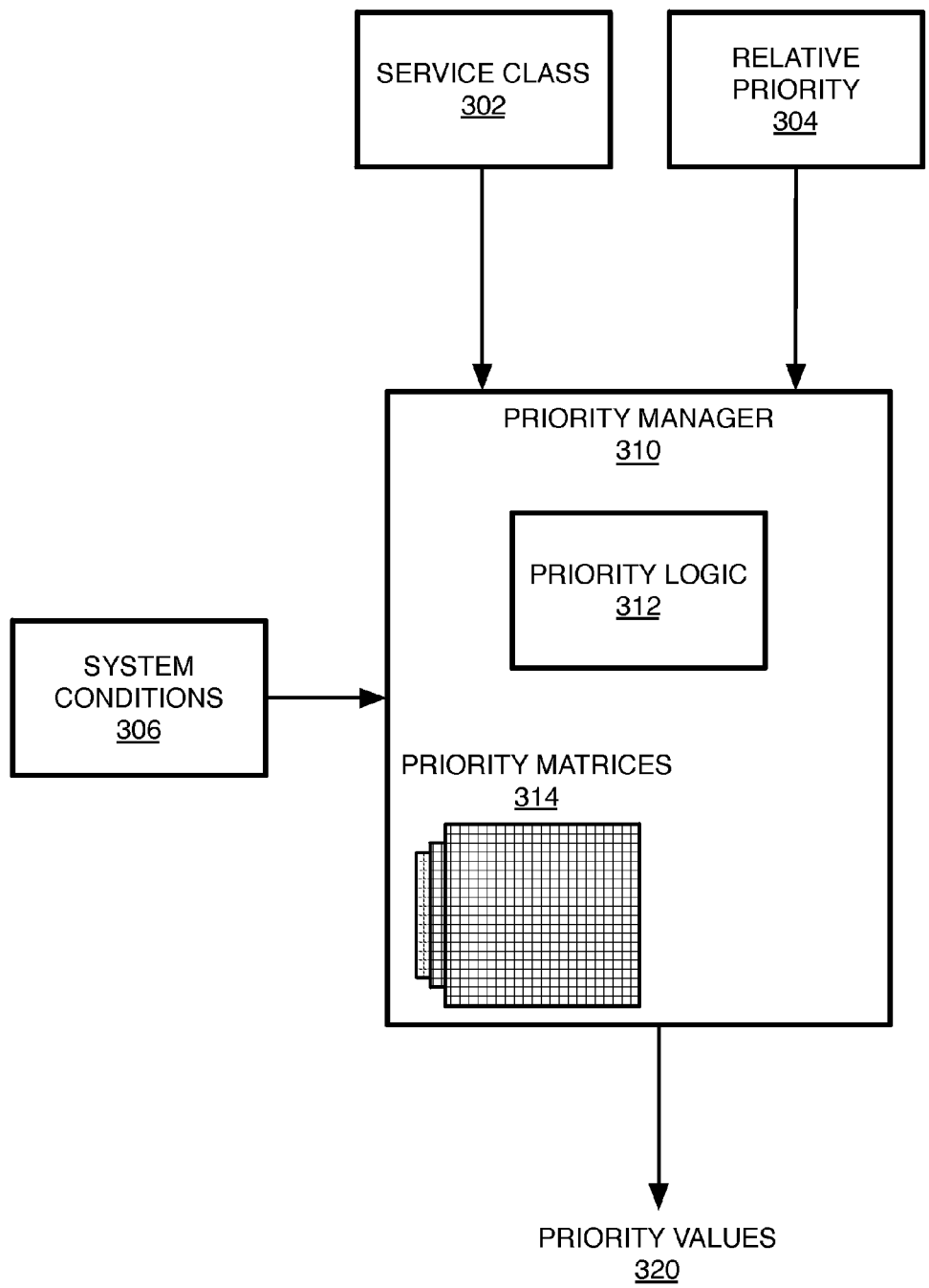
FIG. 3 is a block diagram of an exemplary priority manager, which uses one or more priority matrices to determine the priority values to set for a task.

FIG. 3 is a block diagram of an exemplary priority manager, which uses one or more priority matrices to determine the priority values to set for a task. In one embodiment, a priority manager 310 includes priority logic 312 and one or more priority matrices 314 to determine priority values 320. The priority values 320 can be determined based on the service class 302 for a task, the relative priority for a task 304, and a set of system conditions 306 determined by, for example, the sensors 205 shown in FIG. 2. In one embodiment, each subsystem includes a priority manager 310. In one embodiment, a central priority manager manages priority values for multiple subsystems.

The system conditions 306 can include a current battery level, a system thermal state (e.g., internal temperature, fan speed, etc.), a system power state, and a system load (e.g., processor load, memory bus load, available memory, etc.). Accelerometers and other motion sensors can also be included to determine whether the system is in motion, the axial orientation of the system, the ambient light level, and other conditions that may be relevant to system operation. In one embodiment, system load conditions are determined via sensor algorithms configured to detect logical system conditions, and the priority manager 310 is configured to adjust the determined property values 320 based upon system conditions such as a low memory condition.

In one embodiment, the various system conditions 306 can be consolidated into groups of system condition states by the priority logic 312, where the priority values 320 for the system are adjusted based on a value associated with the consolidated system state (e.g., {plugged/unplugged}, battery {full/low}, temperature {normal/hot}, etc.). System state values can be binary for each set of states, or can include a range of values across each state. The set of system states is adaptable to include additional states across embodiments as additional sensors become available.

Each priority matrix in the set of matrices 314 can store multiple sets of values for each priority value within the various subsystems managed based on the QoS service class 302. In one embodiment, each service class has an associated priority matrix. For example the user initiated class can have a matrix indexed by subsystem priority value, system condition value and relative priority. In one embodiment, the priority matrices 314 are indexed as a multi-dimensional priority matrix having a dimension for each of service class 302, system condition 306, and relative priority 304. In one embodiment, a two-dimensional matrix is used that indexes QoS class and relative priority on a first axis and subsystem priority value on a second axis. An exemplary two-dimensional priority matrix used by the priority logic 312 is shown in Table 1 below.

TABLE 1

Example Priority Matrix

| QoS Class | | Schedule {Plugged/Unplugged} | I/O | Throttle {Normal/Hot} |
|---|---|---|---|---|
| User Interactive | 0 | {47, 30} | 0 | {100%, 80%} |
| | −1 | {45, 28} | 0 | {100%, 80%} |

TABLE 1-continued

Example Priority Matrix

| QoS Class | | Schedule {Plugged/Unplugged} | I/O | Throttle {Normal/Hot} |
|---|---|---|---|---|
| | −2 | {43, 26} | 0 | {100%, 80%} |
| | −3 | {41, 24} | 0 | {100%, 80%} |
| User Initiated | 0 | {38, 22} | 0 | {90%, 60%} |
| | −1 | {36, 20} | 0 | {90%, 60%} |
| | −2 | {34, 18} | 0 | {90%, 60%} |
| | −3 | {32, 16} | 0 | {90%, 60%} |
| Utility | 0 | {20, 15} | 1 | {50%, 40%} |
| | −1 | {18, 15} | 1 | {50%, 40%} |
| | −2 | {16, 15} | 1 | {50%, 40%} |
| | −3 | {15, 15} | 1 | {50%, 40%} |
| Background | 0 | {12, 12} | 2 | {20%, 10%} |
| | −1 | {10, 10} | 2 | {20%, 10%} |
| | −2 | {8, 8} | 2 | {20%, 10%} |
| | −3 | {4, 4} | 2 | {20%, 10%} |

The exemplary priority matrix of Table 1 shows a sample set of priority values for a processing subsystem, an I/O subsystem, and a throttle value applicable to one or more of the processing system and I/O subsystem. An exemplary a user interactive task at relative priority zero has an I/O priority of zero, a processor schedule priority of 47 when system power is sourced from a power adapter, and un-throttled access to one or more of processor and I/O resources when the system is at a normal operating temperature. However, the task schedule priority is reduced when the system is on battery power, and a rate-limiting can engaged if system temperature is above the normal operating range. The precise determination of priority values for each subsystem can follow one of several algorithms based on the manner in which the priority matrices are indexed. Moreover, the precise configuration and priority values shown within Table 1 are exemplary.

Figure 4:
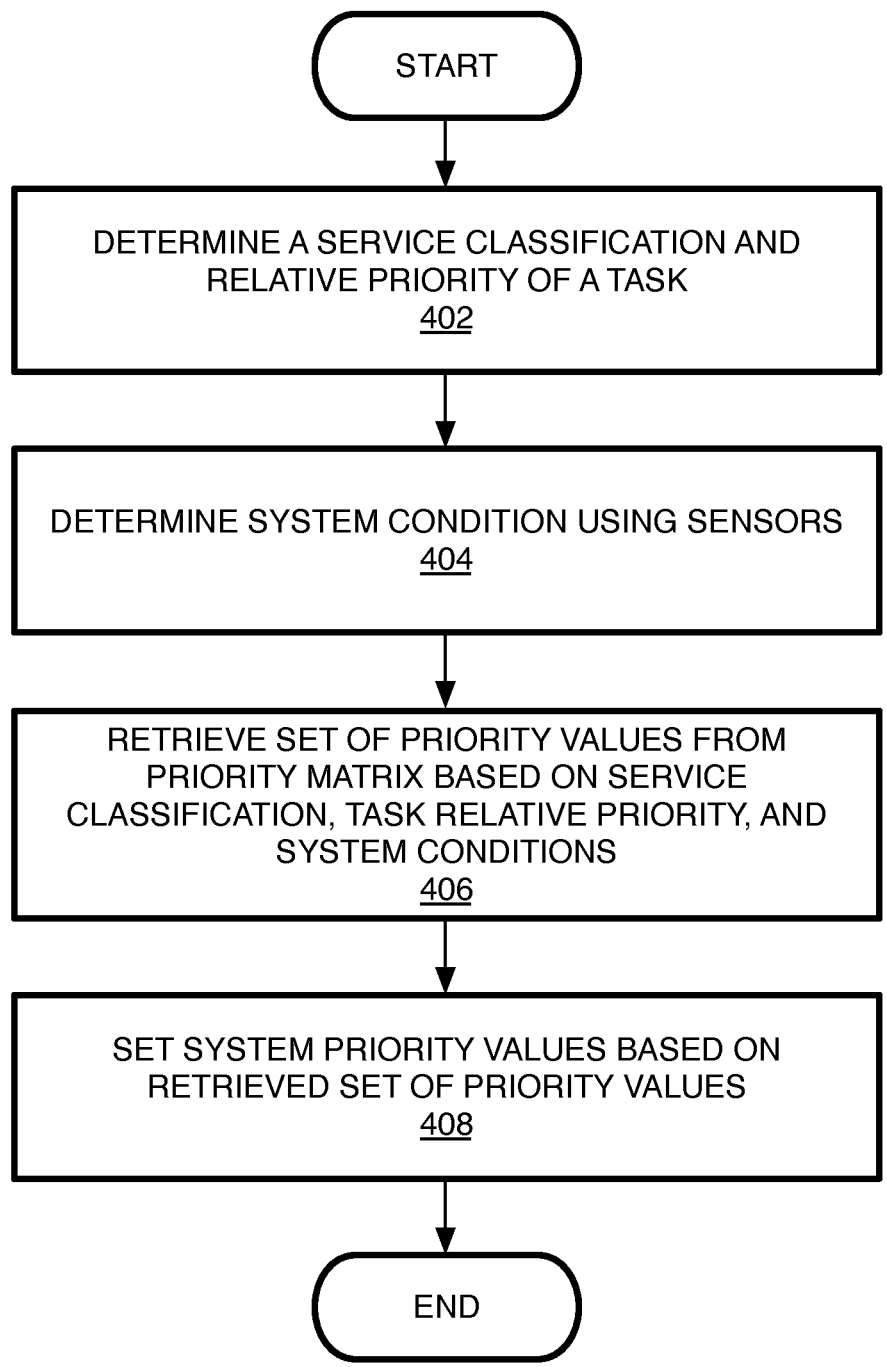
FIG. 4 is a flow diagram of logic to retrieve and set subsystem priority values, according to an embodiment.

FIG. 4 is a flow diagram of logic to retrieve and set subsystem priority values, according to an embodiment. In one embodiment a system priority manager (e.g., priority manager 310 of FIG. 3) can determine a service classification and relative priority of a task, as shown at block 402. The service classification can be determined by the system based on characteristics of the work to be performed or can be assigned to a task by an application developer.

The operating system can determine a QoS class for system tasks based on the characteristics of the work to be performed. For example, the system can assign a system only A/V rendering class to system tasks that performed to support a media playback application. A daemon process can be assigned a background or maintenance task to limit the amount of resources the task can consume and prevent resource contention with user tasks or other system tasks. Additionally, key system tasks can be assigned a high priority QoS class if the task is intended to process a large number of requests from other system or user tasks. In one embodiment, when a second task is operating on a request supplied by a first task, the second task can process the request at the QoS priority of the first task. Additional information on the propagation of QoS classes is provided in conjunction with FIG. 5 below.

For application tasks, the application developer can determine a proper service classification to request for a task based on the type of work to be performed (e.g., user interactive, user initiated, utility, background, etc.) and the system can determine whether to honor the QoS class request. If a developer does not specify a service classification, a default QoS class can be assigned. In one embodiment, the main thread of an application defaults to the user interactive class, as the system presumes that an application performs user interface tasks in the main thread, unless otherwise specified. In one embodiment, a default QoS class is assigned to threads other than the main tread. The default QoS class can be associated with subsystem priority levels between those of the user initiated class and the utility class.

In one embodiment, the initial QoS class assigned to a work element is preserved in the event the QoS class is not honored, such that a first operating system component can honor the QoS class, while a second operating system can process the class using an override QoS class based on one or more system conditions. Each subsystem can have a rule-based approach as to whether to honor a task QoS classification or whether to apply a QoS class override. In one embodiment, the QoS override for a task expresses that an item of pending work classified with a specific QoS class and relative priority depends on the completion of the work currently being executed by the task. In one embodiment, the target of a QoS override executes at the maximum QoS class and relative priority of all overrides and of the QoS class requested by the task itself.

The QoS class interpretations can occur on conjunction with determining system conditions using system sensor, as shown at block 404. In one embodiment, the system conditions are continuously monitored using sensor elements and sensor processing logic. In one embodiment, the priority manager can periodically poll the sensor elements and determine a consolidated system state value. In one embodiment, a system state value is maintained by the operating system and changed in response to one or more system state changes beyond a minimum threshold.

Using the determined service classification, the relative priority value, and the determined system conditions, the priority manager can retrieve the set of priority values from the priority matrix, as shown at block 406. The priority manager can then set the system priority values based on the retrieved set of priority values, as shown at block 408. In one embodiment, if the QoS class for a task is not honored, the original QoS class for the task is maintained, allowing a first subsystem to override the priority matrix values for a QoS class, while a second subsystem honors the priority values for the QoS class. For example, in an extreme overheat condition, the processing subsystem can reduce the throughput values for all QoS classes, or process all QoS classes as a lower QoS class, while the I/O subsystem can continue to honor the QoS classes and the values indicated by the priority matrix.

In one embodiment, once a QoS class for a task is selected and the subsystem priority values for the task are set using the QoS classification system, manual setting of one or more subsystem priorities by an application developer in an manner that is inconsistent with the QoS class can remove a task from automatic priority management. Tasks that are removed from automatic priority management can be flagged as an 'Unspecified' QoS class. For example, if a thread is manually created using a threading interface (e.g., pthreads, etc.) and the thread requests, for example, a utility QoS class, the QoS class of the request may be assigned to the thread. However, if the thread then attempts to manually set a high schedule priority, the QoS class of the thread is unset, or reset to a value associated with the Unspecified QoS class because the high scheduling priority is inconsistent with the utility QoS class.

In one embodiment, when a task is set to the Unspecified QoS class the system will no longer automatically manage the priorities of the thread using the QoS classes system. In one embodiment, the Unspecified QoS class is propagated when the thread class interacts with other tasks, which may prevent automatic priority management for tasks related to the thread in the Unspecified QoS class.

QoS Class Propagation

In one embodiment, additional tasks or threads spawned by a work element carry the QoS class of the parent work element. In one embodiment, when a work element of an application interacts with other work elements or with system components of the operating system, each interaction carries the QoS class of the requestor. System components can have a QoS class based on the work performed by the system component.

Figure 5:
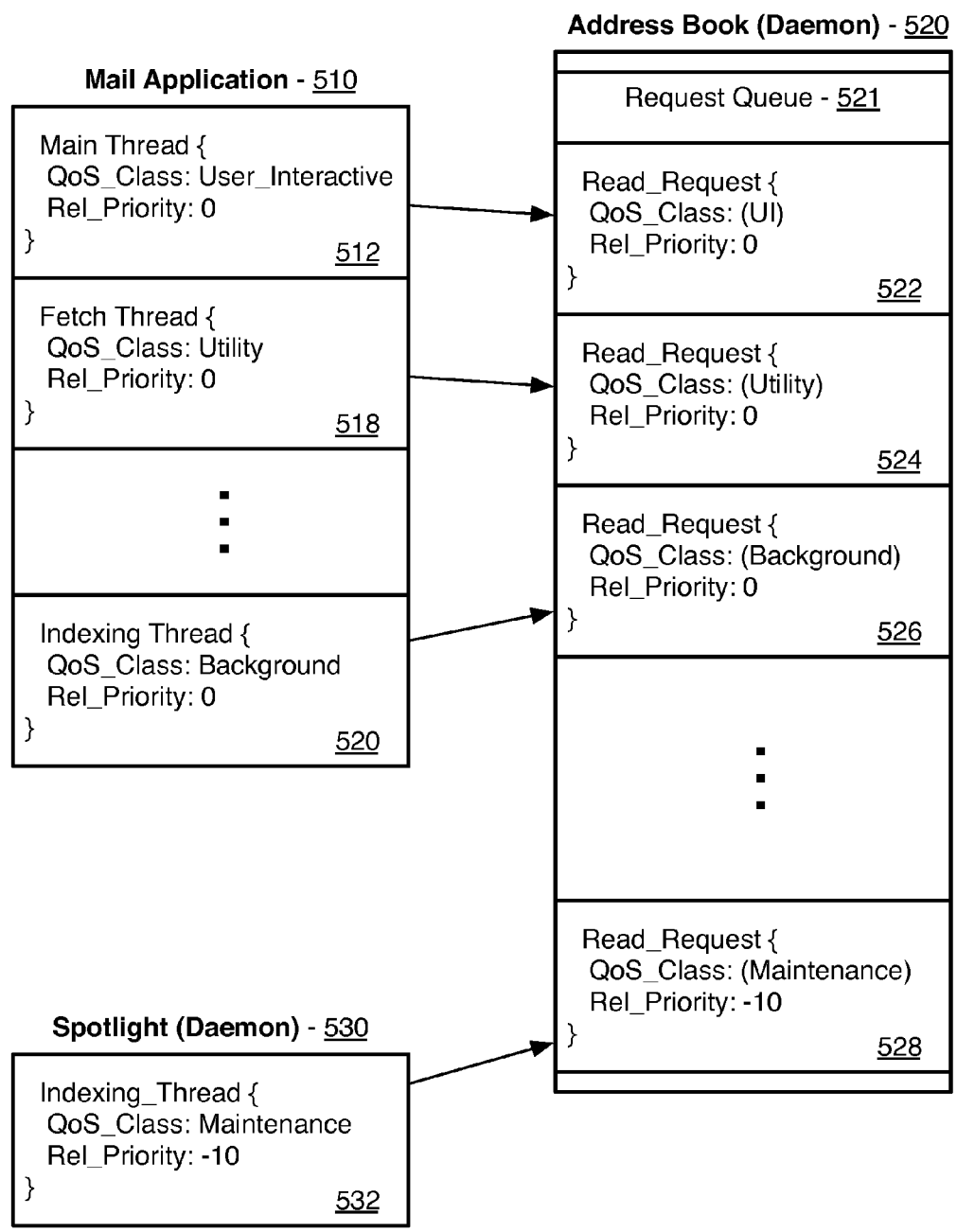
FIG. 5 is a block diagram of QoS class propagation between tasks, according to an embodiment.

FIG. 5 is a block diagram of QoS class propagation between tasks, according to an embodiment. An exemplary mail application 510 can have multiple threads including a main thread 512 having a user interactive service classification, a fetch thread 518 having a utility service classification, and an indexing thread 520 having a background service classification, each at a default relative priority. Each thread in the mail application 510 can concurrently request data from an address book daemon process 520. A set of concurrent requests by the mail application 510 to read data from the address book 520 can be placed into a request queue 521. The address book 520 can handle the request queue 521 via a task having a separate QoS class than any of the requests. Each request can be concurrently processed at the QoS class of the requester.

For example, a request 522 to read address book data for the main thread 512 of the mail application 510 indicates the QoS class of the main thread 512 (e.g., user interactive), and operations by the address book daemon in service of the request 522 can propagate through the system at the user interactive QoS class. Likewise, the operations by the address book daemon 520 in service of the read request 524 from the fetch thread 518 can be processed at the utility service class. A read request 526 from the indexing thread 520 of the mail application 510 can be processed at the background service class. In one embodiment, a system application (e.g., Spotlight 530) can have an indexing task 532 in the maintenance QoS class. A request 528 from the indexing task 532 can also carry the maintenance QoS class.

Figure 6:
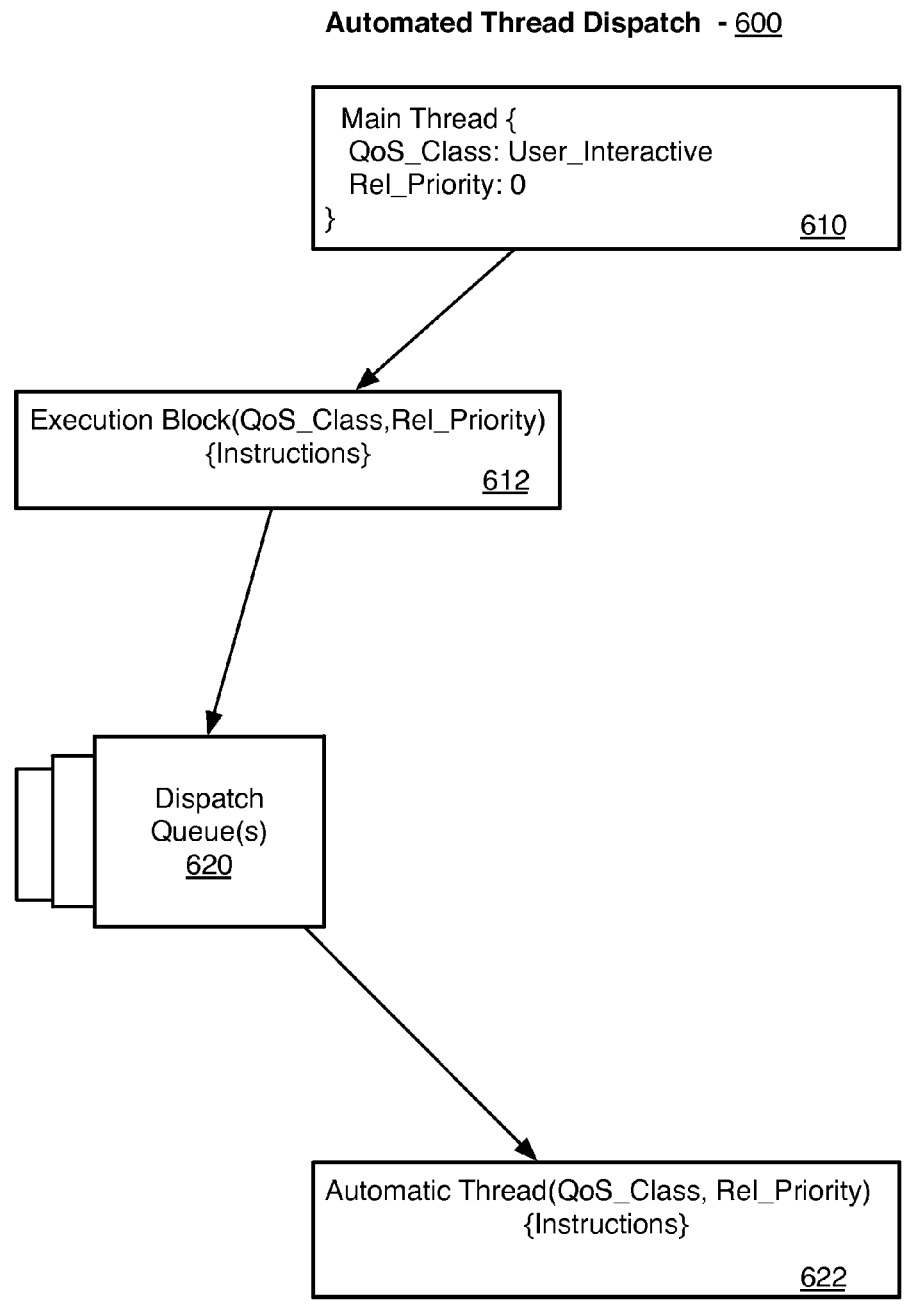
FIG. 6 is a block diagram of an automated thread dispatch system 600 with QoS class support, according to an embodiment.

FIG. 6 is a block diagram of an automated thread dispatch system 600 with QoS class support, according to an embodiment. The dispatch queue mechanism can be used to automate thread management for system and application tasks. In one embodiment automated thread dispatch is available for system operations via a central dispatch system, and is available for user applications via a user level abstraction to the central dispatch system. An application developer can avoid directly handling individual execution threads by passing an execution block 612 from a main thread 610 to a set of concurrent dispatch queues 620. The dispatch queues can then execute the execution block in an automatically managed thread 622. Each execution block 612 can carry instructions to be executed, which inherit the QoS class from the parent of the execution block. A work element can make a synchronous request to a component that is to be performed at the QoS class of the requestor, or an asynchronous request that is performed at the QoS class of the system component.

Figure 7:
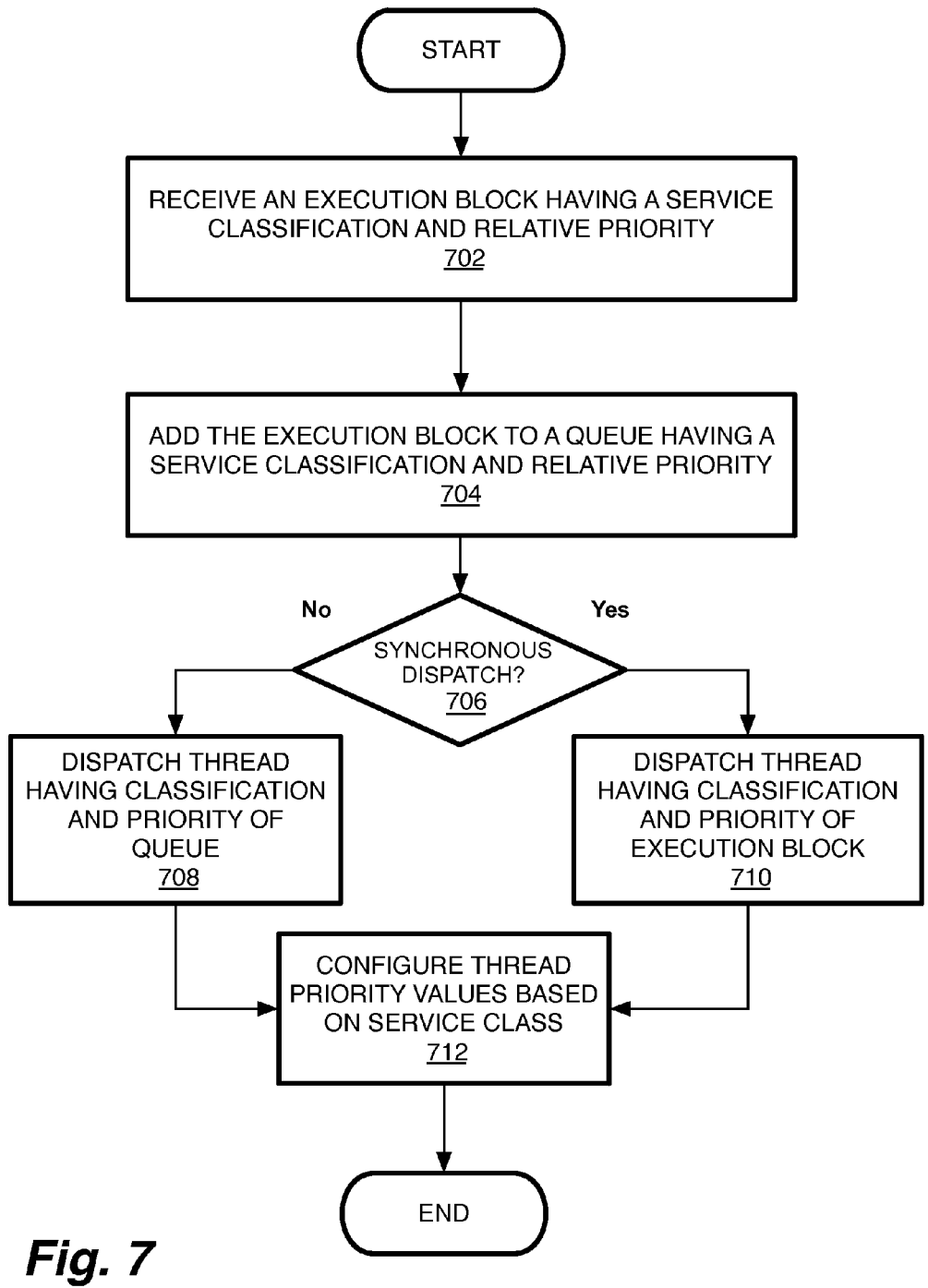
FIG. 7 is a flow diagram of QoS class assignment for a thread when executing instructions in an execution block, according to an embodiment.

FIG. 7 is a flow diagram of QoS class assignment for a thread when executing instructions in an execution block, according to an embodiment. As shown at block 702, the dispatch system can receive an execution block having a service classification and a relative priority. The execution block is added to a queue within the dispatch system. In one embodiment, the dispatch queues can have a service classification, as shown at block 704.

The dispatch system includes synchronous and asynchronous dispatch operations. If, at block 706, the system determines that a synchronous dispatch is requested, the system dispatches a thread having the classification and relative priority associated with the execution block, as shown at block 710. The synchronous dispatch waits for the execution block to complete execution before returning. Accordingly, the execution block is executed at the QoS class and relative priority of the submitter of the execution block, such that an execution block is executed with the appropriate urgency.

In some circumstances, a task may wish to dispatch an execution block and proceed with operations without waiting for the results of the instructions. Accordingly, an embodiment enables an asynchronous dispatch request. At block 706, if the dispatch is determined to be an asynchronous (e.g., not a synchronous request), the system can execute an operation to perform an asynchronous dispatch, as shown at block 708. The asynchronous dispatch returns immediately, allowing the caller to proceed with other operations. The thread is dispatched using the QoS class assigned to the thread. Once the thread is dispatched, the subsystem priorities for one or more subsystems are configured based on the service class of the thread, as shown at block 712.

Figure 8:
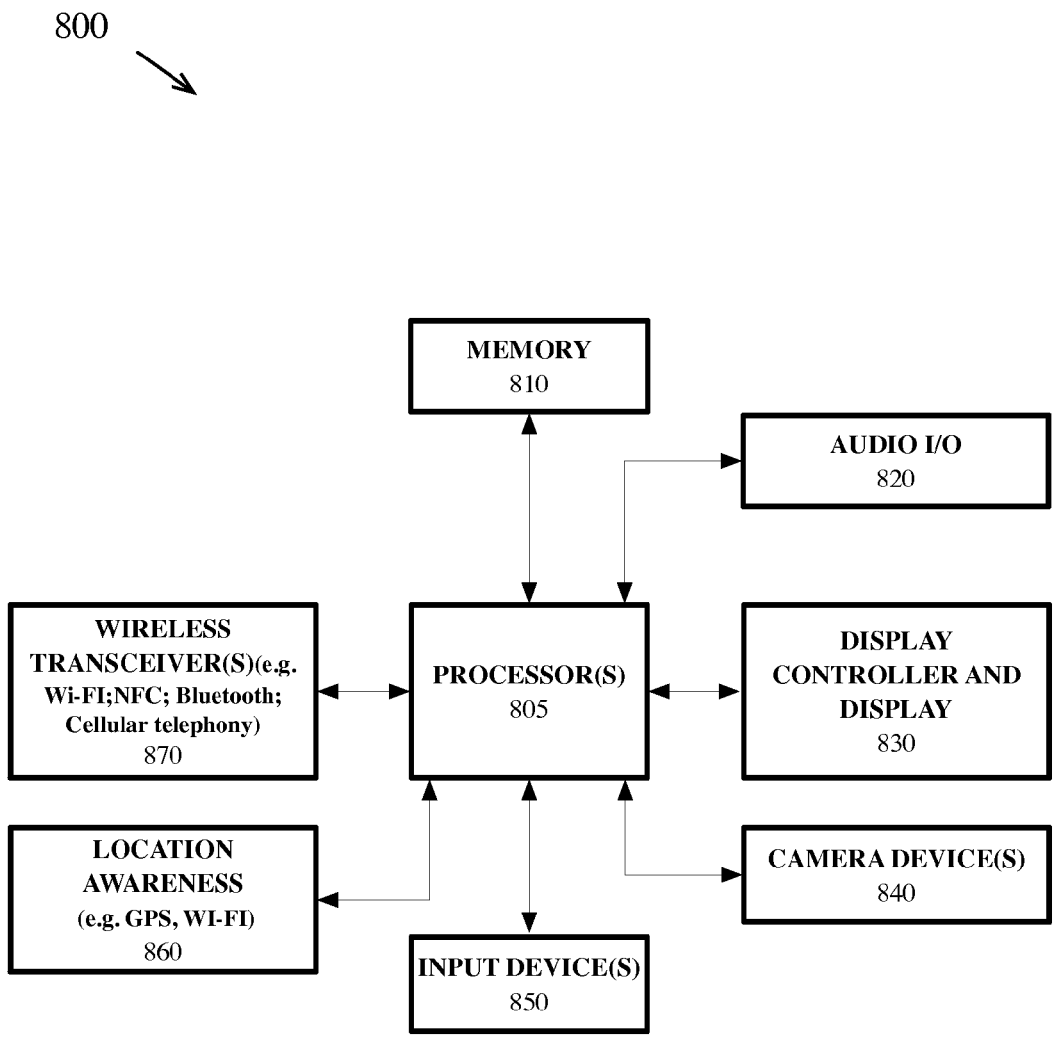
FIG. 8 shows a block diagram illustrating an exemplary data processing system, according to an embodiment.

FIG. 8 shows a block diagram illustrating an exemplary data processing system suitable for use in a mobile or handheld device, according to an embodiment. The data processing system 800 may be a system on a chip integrated circuit suitable for use in handheld or mobile devices. One or more buses or interfaces that are not shown can be used to interconnect the various components, as known in the art. An electronic device constructed using the illustrated data processing system 800 may include additional or fewer components than shown.

The system can include includes a processing system 805 having one or more microprocessors, and memory 810 for storing data and programs for execution by the processing system 805. An audio I/O subsystem 820 is included, which may include a microphone and a speaker for playing back music. The audio I/O subsystem 820 can also provide telephone functionality through the speaker and microphone.

A display controller and display device 830 can be included to provide a graphical user interface for the user, and a wireless transceiver 870 may be available to transmit and receive data via one or more wireless technologies, such as Wi-Fi, infrared, Bluetooth, or one or more variants of wireless cellular technology. The system 800 can contain one or more camera devices 840 in both a front and rear facing configuration, though similarly configured systems each with only a front facing camera or rear facing camera can be one of many optimal configurations. The data processing system 800 also includes one or more input devices 850 to enable a user to provide input to the system. Input devices may include a keypad or keyboard, alone or in conjunction with a touch or multi touch panel that is overlaid on the display device 830. The display device and touch panel can be adjusted in real time using factory-generated calibration data described herein. The data processing system 800 can also include a device for providing location awareness services, such as a Global Positioning System (GPS) device 860 or its equivalent, which can also be adjusted using factory-generated calibration data.

In one embodiment, one or more sensors 880 are included in the data processing system to detect a set of system conditions. The sensors can include one or more accelerometers or other motion sensors, proximity sensors, thermal sensors, magnetometers, pressure sensors, etc. In one embodiment, the accelerometer can be a single-axis or multi-axis accelerometer, and can include a free-fall sensor. The sensors 880 can also include a power sensor configured to monitor system power state and power consumption, including the condition of one or more batteries coupled to the system 800.

Figure 9:
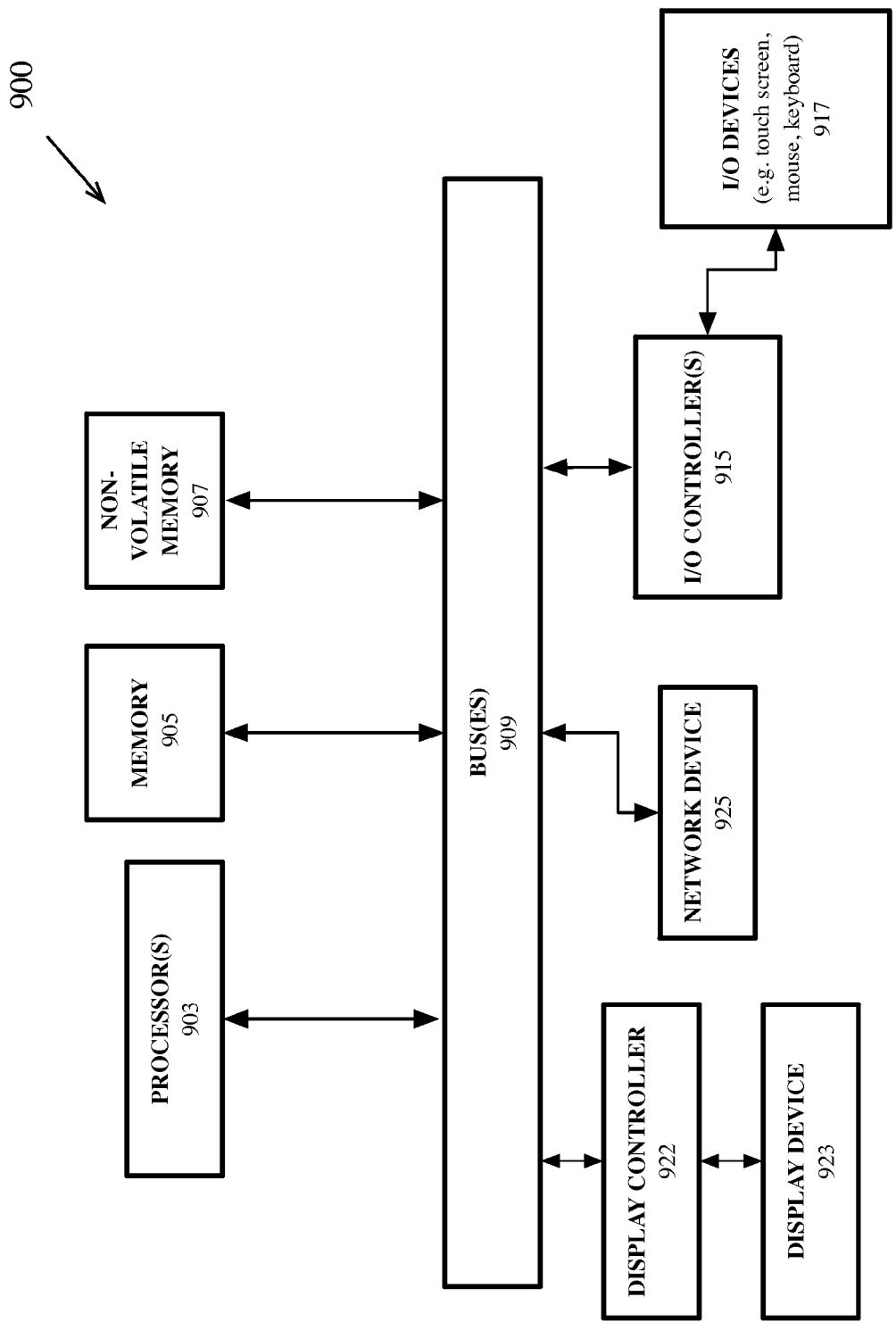
FIG. 9 shows a block diagram illustrating an additional exemplary data processing system, according to an embodiment.

FIG. 9 shows a block diagram illustrating an additional exemplary data processing system suitable for use within a workstation, a mobile workstation or a server, according to an embodiment. The data processing system 900 includes one or more buses 909, which serve to interconnect the various components of the system. One or more processors 903, each containing one or more processor cores, are coupled to the one or more buses 909 as is known in the art. Memory 905 may be volatile Sequential DRAM, nonvolatile RAM or may be flash memory or other types of semiconductor memory. The memory 905 is coupled to the one or more buses 909 using techniques known in the art.

The data processing system 900 can also include nonvolatile memory 907 for data storage, which may be a hard disk drive, flash memory, optical memory, or other type of memory system that maintains data after all power is removed from the system. The nonvolatile memory 907 and the memory 905 can both couple to the one or more buses 909 using known interfaces and connection techniques. A display controller 922 is coupled to the one or more buses 909 in order to receive display data to be displayed on a display device 923. The display device 923 can include an integrated touch input to provide a touch screen. The data processing system 900 can also include one or more I/O controllers 915 to provide interfaces for one or more I/O devices, including touch screens, touch pads, joysticks, one or more mouse inputs, and other input devices including those known in the art. The I/O controller can also provide interfaces for one or more output devices (e.g., speakers). The input/output devices 917 are coupled through one or more I/O controllers 915 as is known in the art. Additionally, one or more network interfaces 925 can also be coupled to the one or more buses to provide access to one or more networks.

While FIG. 9 shows that the nonvolatile memory 907 and the memory 905 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers. Additionally, the data processing system 900 can include one or more sensors (not shown) such as the sensors 880 of system 800.

The techniques and methods described herein may be carried out in a data processing system in response to its processor executing a sequence of instructions contained in a volatile, non-transitory memory such as the memory 905 or the nonvolatile memory 907 or a combination of such memories. In various embodiments, hardwired circuitry may be used in combination with software instructions, thus the techniques are not limited to any specific combination of hardware circuitry and software or to any particular source for the instructions executed by the data processing system.

The techniques disclosed herein are not limited to any specific combination of hardware circuitry and software, or to any particular source for the instructions executed by the data processing system associated an apparatus for performing one or more of the operations described herein. In various embodiments, software-instructions stored on a machine-readable storage medium can be used in combination with hardwired circuitry, such as specialized processing logic or general purposes processing logic configured to execute instructions from a non-transitory machine-readable storage medium. Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals.

In the specification and figures, various embodiments, methods, systems or devices for implementing quality of service classifications to provide a holistic priority system. The priority system can automate the setting of multiple data processing system priorities based on the quality of service classification. In one embodiment, a data processing system comprising one or more processors, one or more sensors, and a memory storage system is configured to monitor a set of system conditions.

A priority manager stored on the memory storage system can use a priority matrix to set multiple sets of priority values associated with multiple system priorities. The priority manager can be configured to set the multiple system priorities for work elements based at least in part on a set of priority values in the priority matrix and the set of system conditions determined buy the one or more sensors. A work element consists of a task, thread, or other grouping of instructions for execution by a processor. In one embodiment, a thread is the smallest sequence of programmed instructions managed by the processing subsystem scheduler. A task can refer to generically to a thread, or specifically to an automatically managed thread provided by the operating system of the data processing system to execute an execution block provided by a thread or process. An example of task execution via automated thread dispatching is shown in FIG. 6.

In one embodiment, the priority manager is to set the multiple system priorities for a first task based at least in part on a first set of priority values associated with a first service classification of multiple service classifications. The first task can be a task for a user space application, where the multiple service classifications include a classification for rendering operations, user initiated operations, utility operations and application background operations.

In one embodiment, the priority manager is to set the multiple system priorities for a task to perform a system operation for the operating system of the data processing system, where the multiple service classifications include a classification for system rendering operations and a classification for system background operations or system maintenance operations.

In one embodiment the priority matrix includes values associated with each of the multiple system priorities, where the multiple system priorities can include a processor priority associated with the one or more processors and an input/output priority associated with the memory storage system. The multiple system priorities can additionally include a throttling priority, a timer latency classification, and a throughput classification.

In one embodiment, a second task including a second service classification of the multiple service classifications can execute on the one or more processors of the data processing system. The second task can be configured to process a request received from the first task. When the request is a synchronous request, the system priorities for the request can be inherited from the first task and set at least in part based on the first service classification. When the request is an asynchronous request, the system priorities for the request can be based on the service classification of the second task and set based on the second service classification. In one embodiment, the second task includes a request queue to store the request received from the first task. The request queue can have a third service classification, where the system priorities for the asynchronous request are set to the third service classification.

In one embodiment, the set of system conditions monitored by the one or more sensors include battery, thermal, and a power conditions, and the priority matrix includes multiple sets of values that correspond with a combination of system conditions in the set of system conditions. In one embodiment, the set of system conditions additionally includes an available memory condition.

In one embodiment, a non-transitory computer-readable medium stores instructions which, when executed by a processor, cause the processor to perform operations comprising assigning, to a first task, a first service classification selected from multiple service classifications, each service classification associated with a priority matrix having multiple sets of priority values corresponding to multiple system priorities, wherein the first service classification is associated with a first priority matrix, and based on a set of system conditions detected by one or more sensors, setting multiple system priorities for the first task based on values in a first set of priority values of the first priority matrix.

In one embodiment, the medium further comprises instructions to perform further operations including receiving from the first task a request including an execution block having the service classification of the first task and in response to the request, adding the execution block to a queue of a second task. The second task can have a second service classification that is different from the first service classification. The second task can then process one or more execution threads associated with the execution block. The execution threads can inherit the service classification assigned to the first task.

In one embodiment, the medium further comprises instructions to perform further operations including, based on the set of system conditions detected by the one or more sensors, setting multiple system priority values for one or more execution threads based a set of priority values associated with the set of system conditions and the service classification. In one embodiment, the instructions additionally include, in response to a change in a condition in the set of system conditions, assigning new values to the multiple system priorities based on values in a second set of priority values associated with the set of system conditions and the service classification.

In one embodiment, a data processing system can implement a computer-implemented method to manage task priorities. The method can include assigning, to a first task, a first service classification selected from multiple service classifications, where each service classification is associated with a priority matrix having multiple sets of priority values corresponding to multiple system priorities and the first service classification is associated with a first priority matrix. The method can additionally include setting multiple system priorities for the first task based on values in a first set of priority values of the first priority matrix, and additionally based on a set of system conditions detected by one or more sensors.

In one embodiment, the method includes receiving from the first task a request including an execution block having the service classification of the first task and, in response to the request, adding the execution block to a queue of a second task, where the second task has a second service classification different from the first service classification. The second task can process one or more execution threads associated with the execution block, where each execution thread associated with the execution block inherits the service classification assigned to the first task. Though each execution thread associated with the execution block inherits the service classification assigned to the first task, the second task can process the execution threads at the service classification of the second task, if the request is an asynchronous request. In one embodiment, the second task places requests in a queue. The queue can have a service classification, and an asynchronous request can be processed at the service classification of the queue. The service classification of the queue can be different from the service classification of the second task. If the first task is to have the second task process the execution block at the service classification of the first task, the first task may make send a synchronous request to the second task.

It will be evident, however, that various modifications and changes can be made to the embodiments described, and it will be apparent to those skilled in the art that many further modifications and adaptations can be made without departing from the spirit of the concepts set forth herein. Accordingly, the scope of the invention is not to be determined or limited by the specific examples provided above but only by the claims below.

What is claimed is:

1. A data processing system comprising:
   one or more processors;
   one or more sensors coupled to the one or more processors, the sensors to monitor a set of system conditions, the set of system conditions including one or more power related system conditions;
   a memory storage system coupled to the one or more processors;
   a priority matrix stored on the memory storage system, the priority matrix associated with at least one of multiple service classifications, wherein the priority matrix includes multiple sets of priority values associated with multiple system priorities; and
   a priority manager to:
   determine a service classification and relative priority of a task, the service classification selected from the multiple service classifications and associated with the priority matrix;
   set multiple system priorities for the task based on values in a first set of the multiple sets of priority values of the priority matrix based at least in part on the set of system conditions detected by one or more sensors; and
   set the multiple system priorities for the task based on values in a second set of the multiple sets of priority values of the first priority matrix in response to a change in a condition in the set of system conditions detected by the one or more sensors.

2. The system as in claim 1, wherein the priority manager is to reference a first set of priority values from the priority matrix using the service classification, a relative priority, and the set of system conditions.

3. The system as in claim 2, wherein the task is to perform an operation for a user space application.

4. The system as in claim 3, wherein the multiple service classifications include a separate classification for each of user interactive operations, user initiated operations, and application background operations.

5. The system as in claim 4, wherein the multiple service classifications additionally include a classification for application utility operations.

6. The system as in claim 2, wherein the task is to perform an operation for an operating system of the data processing system.

7. The system as in claim 6, wherein the multiple service classifications include a classification for system rendering operations and a classification for system background or maintenance operations.

8. The system as in claim 1, wherein the priority matrix includes values associated with each of the multiple system priorities.

9. The system as in claim 8, wherein the multiple system priorities include a processor priority associated with the one or more processors and an input/output priority associated with the memory storage system.

10. The system as in claim 9, wherein the multiple system priorities additionally include a throttling priority, a timer priority, and a throughput priority.

11. The system as in claim 1, wherein the task is a first task including a first service classification, and further including a second task to execute on the one or more processors, the second task including a second service classification, wherein the second task is to process a request received from the first task.

12. The system as in claim 11, wherein the multiple system priorities for the request are set based on the first service classification when the request is a synchronous request.

13. The system as in claim 11, wherein the multiple system priorities for the request are set based on the second service classification when the request is an asynchronous request.

14. The system as in claim 1, wherein the set of system conditions monitored by the one or more sensors include a battery state, a power state, and a thermal state.

15. The system as in claim 14, wherein the priority matrix includes multiple sets of priority values that correspond with a combination of system conditions in the set of system conditions, and the set of system conditions additionally includes a one or more system load states including processor load, memory bus load, and a low memory condition.

16. A non-transitory computer-readable medium storing instructions which, when executed by one or more processors, cause the one or more processors to perform operations comprising:
   determining a service classification and relative priority of a task, the service classification selected from multiple service classifications, each service classification associated with a priority matrix having multiple sets of priority values corresponding to multiple system priorities, wherein the service classification is a first service classification associated with a first priority matrix;

based at least in part on a set of system conditions detected by one or more sensors, setting multiple system priorities for the task based on values in a first set of priority values of the first priority matrix, the set of system conditions including one or more power related system conditions; and in response to a change in a condition in the set of system conditions, setting multiple system priorities for the task based on values in a second set of priority values of the first priority matrix.

17. The medium as in claim 16, wherein determining a service classification for the task includes determining whether to honor the service classification requested by the task and the set of system conditions monitored by the one or more sensors include a battery state, a power state, and a thermal state.

18. The medium as in claim 16, wherein the task is a first task, and further comprising instructions to perform further operations including:
receiving from the first task a request including an execution block having the service classification of the first task and the relative priority of the first task;
in response to the request, adding the execution block to a queue of a second task, the second task including a second service classification different from the first service classification; and
dispatching, by the second task, one or more execution threads associated with the execution block, each execution thread inheriting the service classification assigned to the first task.

19. The medium as in claim 18, wherein the request is a synchronous request, and dispatching by the second task includes dispatching the execution threads at the service classification inherited from the first task.

20. The medium as in claim 19, further comprising instructions to perform further operations including:
based on the set of system conditions detected by the one or more sensors, setting multiple system priority values for the one or more execution threads based on a set of corresponding values in the first set of priority values of the first priority matrix; and
in response to a change in a condition in the set of system conditions, setting the system priority values for the one or more execution threads based on values in a second set of priority values of the first priority matrix.

21. The medium as in claim 18, wherein the request is an asynchronous request, and dispatching by the second task includes dispatching the execution threads at the service classification of the second task.

22. The medium as in claim 21, wherein the queue of the second task has a service classification, and dispatching by the second task includes dispatching the execution threads at the service classification of the queue.

23. The medium as in claim 21, further comprising instructions to perform further operations including:
based at least in part on the set of system conditions detected by the one or more sensors, setting multiple system priority values for the one or more execution threads based on a set of corresponding values in the first set of priority values in a second priority matrix; and in response to a change in a condition in the set of system conditions, assigning new values to the multiple system priorities based on values in a second set of priority values in the second priority matrix.

24. A computer-implemented method comprising:
determining a service classification and a relative priority of a first task, the service classification selected from multiple service classifications, each of the multiple service classifications associated with a priority matrix having multiple sets of priority values corresponding to multiple system priorities, the service classification associated with a priority matrix, and wherein determining the service classification for the task includes determining whether to honor the service classification requested by the first task;
based on a set of system conditions detected by one or more sensors, the set of system conditions including one or more power related system conditions, and the relative priority assigned to the first task, setting multiple system priorities for the first task based on values in a first set of priority values of the priority matrix;
receiving from the first task a request including an execution block having the service classification of the first task;
in response to the request, adding the execution block to a queue of a second task, the second task including a second service classification different from the service classification of the first task;
dispatching, by the second task, one or more execution threads associated with the execution block, each execution thread inheriting the service classification of the first task;
wherein dispatching by the second task includes dispatching the execution threads at the service classification inherited from the first task when the request from the first task is a synchronous request; and
wherein dispatching by the second task includes dispatching the execution threads at the service classification of the second task when the request from the first task is an asynchronous request.

25. The method of claim 24, wherein the queue of the second task has a service classification, and dispatching by the second task includes dispatching the execution threads at the service classification of the queue.

26. The method of claim 25, further comprising:
setting multiple system priority values for the one or more execution threads based on a set of corresponding values in the first set of priority values associated with a first set of system conditions detected by the one or more sensors; and
in response to a new set of system conditions detected by the sensors, assigning values to the multiple system priorities based on values in a second set of priority values associated with the new set of system conditions.

27. The method of claim 24, wherein determining whether to honor the service classification requested by the first task includes determining whether to assign the service classification requested by the first task.

28. The method of claim 24, wherein the set of system conditions monitored by the one or more sensors include a battery state, a power state, and a thermal state.

29. A non-transitory computer-readable medium storing instructions which, when executed by a processor, cause the processor to perform operations comprising the method of claim 24.

* * * * *